United States Patent [19]

Messerly et al.

[11] Patent Number: 5,052,444

[45] Date of Patent: Oct. 1, 1991

[54] REINFORCED FLUID HOSE HAVING ON-BONDED TAPE

[75] Inventors: James W. Messerly, Stow; Lawrence E. Bouscher, Concord; James E. Stahl, Garrettsville, all of Ohio

[73] Assignee: The Fluorocarbon Company, Mantua, Ohio

[21] Appl. No.: 44,265

[22] Filed: Apr. 30, 1987

[51] Int. Cl.⁵ ............................................. F16L 9/16
[52] U.S. Cl. ...................................... 138/125; 138/103; 138/128; 138/129; 138/124; 138/132; 138/174; 138/137; 174/47; 361/215
[58] Field of Search ............... 138/123, 124, 125, 126, 138/127, 129, 132, 133, 134, 135, 137, 138, 140, 145, 150, 128, 154, 174, 172, 177, 178, 103; 174/47; 361/215

[56] References Cited

U.S. PATENT DOCUMENTS

| | | |
|---|---|---|
| 924,782 | 6/1909 | Hoppe ................................. 138/132 |
| 1,726,957 | 9/1929 | Hughes ................................ 138/127 |
| 2,076,729 | 4/1937 | Kennedy ............................. 138/126 |
| 2,800,145 | 7/1957 | Peierls et al. .................. 138/137 X |
| 3,212,528 | 10/1965 | Haas ................................ 138/138 X |
| 3,245,431 | 4/1966 | Coe . | |
| 3,390,704 | 7/1968 | Woodell .............................. 138/143 |
| 3,980,107 | 9/1976 | Barnes .............................. 138/149 X |
| 4,212,327 | 7/1980 | Horen et al. ........................ 138/125 |
| 4,303,457 | 12/1981 | Johansen et al. ............... 138/137 X |
| 4,510,974 | 4/1985 | Natori et al. ........................ 138/127 |
| 4,620,569 | 11/1986 | Von Glanstalten ............ 138/129 X |

FOREIGN PATENT DOCUMENTS 2912040 10/1980 Fed. Rep. of Germany ...... 138/127

Primary Examiner—James E. Bryant, III
Attorney, Agent, or Firm—Fay, Sharpe, Beall, Fagan, Minnich & McKee

[57] ABSTRACT

Provided is a flexible reinforced hose (50) having an inner core tube (2) for conveying fluids surrounded by two layers of tensioned fibrous reinforcement layer (4, 8) between which is disposed a spirally wound flexible polymeric tape (6) which is unbonded to either of the reinforcement layers and free to move relative thereto under flexing and pressure pulsing conditions and which is adapted to prevent moisture from pentrating core tube (2) from outside of hose (50). Other preferred embodiments include hose (60) in which a flexible polymeric tape (12) is applied longitudinally and hose (70) where the tape is a flexible polymeric metal composite tape (20) as well as hose (32) in which the reinforcement layers (32, 36) are oppositely helically wound.

11 Claims, 1 Drawing Sheet

REINFORCED FLUID HOSE HAVING ON-BONDED TAPE

INTRODUCTION

This invention relates generally to a flexible reinforced hose for conveying fluids under pressure and more particularly to an improved reinforced hose that includes a flexible polymeric or polymeric/metal composite tape disposed in un-bonded relationship between two layers of tensioned fibrous reinforcement material disposed about the core tube of the hose that is adapted to provide a barrier against penetration of moisture through the core tube from outside the hose and thereby prevent the moisture from contaminating the fluid being conveyed therethrough.

BACKGROUND OF THE INVENTION

Fibrous reinforced hose made from polymeric materials such as flexible nylon and polyurethane materials often convey fluids such as chloro-fluorinated hydrocarbon refrigerants and isocyanates that are adversely affected by moisture that may penetrate through the hose core tube from outside of the hose such as where the hose is being used in a wet environment.

Another example is flexible polymeric reinforced hose that is utilized to convey paint or other fluids that are apt to create a build-up of static electricity at an outlet such as a spray nozzle that must be drained to ground through the hose of which two examples are the semi-conductive hoses respectively described in U.S. Pat. Nos. 4,196,464 and 4,303,457, owned by the assignee of this invention and the disclosures of which are incorporated herein by reference. Such hoses generally feature a composite core tube having an inner liner made from a substantially non-electrically conductive flexible polymeric material surrounded by an electrically semi-conductive flexible polymeric material adapted to conduct static electricity to ground.

Heretofore, the only known flexible polymeric reinforced hose known to include a metal or polymeric/metal composite tape barrier for preventing water from penetrating through the core tube from outside of the hose and adversely affecting the refrigerant fluid is disclosed in U.S. Pat. No. 4,510,974, the disclosure of which is incorporated herein by reference. However, the patent teaches that one must place the subject tape in contact with the core tube and in the event the metal includes a polymeric layer, the polymer must be of an adhesive type that bonds the metal to the core tube.

Surprisingly, no one prior to the present invention had thought of the advantages achieved by placing a polymeric or polymeric/metal composite tape adapted to provide a barrier against moisture from penetrating the core tube from outside the hose between two layers of fibrous reinforcement used to reinforce the hose against fluid pressure rather than in contact with the core tube in addition to providing that an un-bonded relationship exist between the tape and the fibrous reinforcement layers under bending and fluid pressure pulsing conditions. It is to this concept that the present invention is addressed.

SUMMARY OF THE INVENTION

Accordingly, it is an object of this invention to provide a fluid conveying fibrous reinforced hose that includes a flexible polymeric or polymeric/metal composite tape barrier adapted to prevent moisture from penetrating through the core tube from outside the hose and contaminating the fluid.

It is another object of this invention to provide an improved flexible fibrous reinforced hose that is provided with a flexible polymeric or polymeric/metal composite tape moisture barrier between two layers of fibrous reinforcement that is in un-bonded relationship with the fibrous layers so as to minimize stresses imposed thereupon during bending and fluid pressure pulsing of the hose.

DESCRIPTION OF SOME PREFERRED EMBODIMENTS

Figure 1:
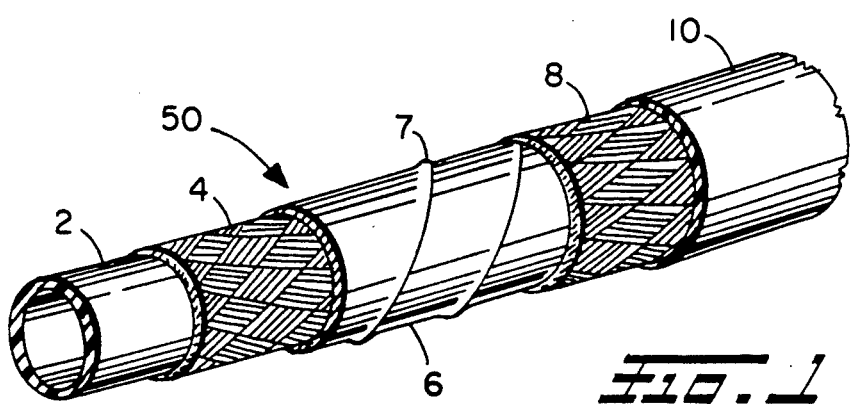
FIGS. 1-4 are respective perspective views of respective flexible fibrous reinforced hoses 50, 60, 70 and 80 made in accordance with the invention.

Hose 50 of FIG. 1 has a flexible tubular core tube 2 made from a suitable flexible polymeric material which commonly includes a flexible nylon such as nylon 11 or nylon 12 or a flexible polyurethane or other suitable polymers or copolymers well known to those skilled in the art that are commonly melt extruded into a tubular core tube. The choice of a particular polymeric material for making core tube 2 depends upon a variety of factors not the least of which is that the core tube material must be compatible with and not degraded by the fluid being conveyed through the core tube.

A layer 4 of braided fibrous material is disposed under tension about core tube 2. The material from which layer 4 is made includes filaments of nylon, poly-(alkylene terephthalate) ester such as sold under the Trademark "Dacron" by the Dupont Company, aromatic polyamide such as sold under the Trademark "Kevlar" by the Dupont Company and mixtures thereof.

A flexible polymeric tape 6 is spirally wrapped completely about reinforcement layer 4 and core tube 2. Tape 6 has an overlap seam 7 that extends helically along core tube 2. Tape 6 preferably has a thickness of from about 1 to about 10 mils and more preferably from about 1 to 2 mils. The width of tape 6 depends upon the outer diameter of inner reinforcement layer 4 which in turn is determined largely by the bore diameter of core tube 2 where, for example, for a bore diameter of about ⅜ inch, a tape 6 having a width of about 1¾ inch can be utilized to advantage to provide complete coverage about core tube 2 at a suitable helical angle. Generally, the width of the edge overlap is preferably between about 10% and about 70% of the tape width and more preferably about 50%.

A layer 8 of braided fibrous reinforcement material is disposed under tension about tape 6. Layer 8 is made from filaments of fibrous material previously described.

Figure 3:
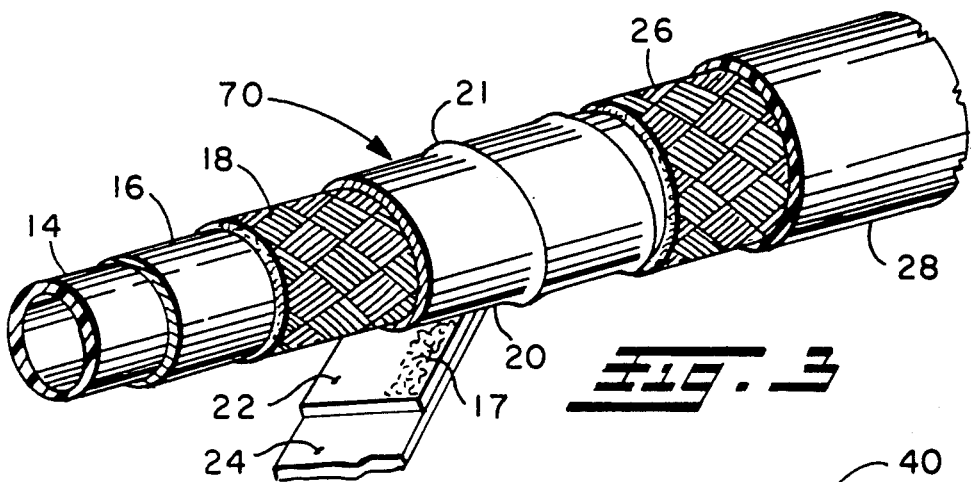

Tape 6 is in un-bonded relationship with fibrous reinforcement layers 4 and 8 so that it can slip relative thereto and minimize stress imposed thereupon by reinforcement layers 6 and 8 during bending and from volumetric changes occurring during fluid pressure pulsing of hose 50. Tape 6 may include a suitable adhesive coating disposed along the overlap region to bond the overlap together to even further prevent moisture from penetrating into core tube 2 from outside hose 50 provided that surface of tape 6 respectively adjacent to inner reinforcement layer 4 and outer reinforcement layer 8 remain unbonded thereto. Hose 70 hereinafter described with respect to FIG. 3 shows an example of an adhesive coating 17 disposed along the overlap region of a flexible metal layer 17. In the event that an adhesive layer is included in the manner herein described, the breadth of the overlap can be accordingly decreased from the preferred 30%-70% range previously described if such is desired.

A protective sheath or jacket 10 is disposed about fibrous reinforcement layer 8. Although sheath 10 may be made from any suitable flexible protective material, it is commonly made from a flexible polymeric material such as nylon or polyurethane and particularly a polyether-based polyurethane that is melt extruded about the outermost reinforcement layer. In many instances flexible polyurethane is preferred for sheath 10 due to its high abrasion resistance in combination with high flexibility.

Figure 2:
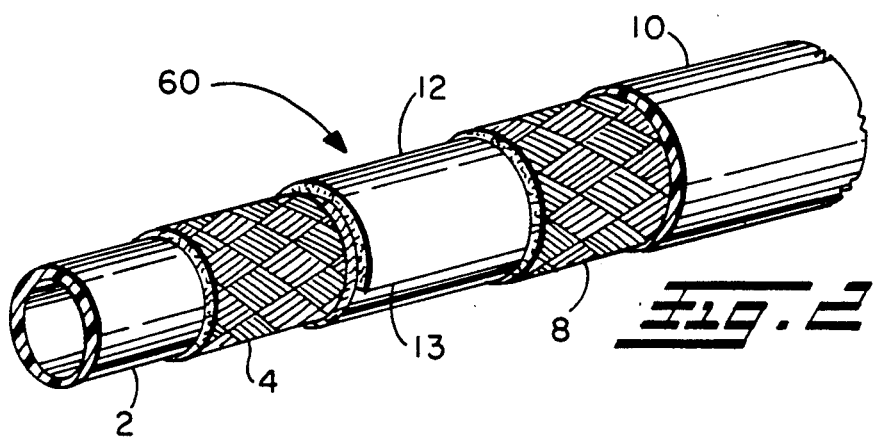

Hose 60 of FIG. 2 is substantially the same as hose 50 previously described excepting that the polymeric tape 12 is a longitudinally folded tape having an overlap seam 13 that extends longitudinally along core tube 2.

Hose 70 of FIG. 3 differs from hoses 50 and 60 previously described in that it has a composite core tube having an inner flexible polymeric layer 14 and an outer flexible polymeric layer 16 that is made from a different polymer than layer 14. The polymer of inner layer 14 may, for example, be a flexible nylon 11 having a shore D hardness of about 50 to 60 and outer layer 16 may be a softer material such as a polyurethane having a shore A hardness of about 80 to about 95 to improve flexibility of the hose and provide an outer surface to which the reinforcement material may be more readily bonded to. Outer layer 16 may, for example, be made from a flexible semi-conductive polymer such as described in U.S. Pat. Nos. 4,196,464 and 4,303,457 previously described. Such composite core tubes are commonly co-extruded so that they melt fuse together as is well known to those skilled in the art. Generally, such semi-conductive polymers are made electrically semi-conductive by including uniformly dispersed electrically conductive particles such as carbon particles in an amount providing the ambient electrical volume resistivity desired.

Outer layer 16 of the composite core tube of hose 70 is surrounded by a braided layer 18 of tensioned fibrous filament material previously described. A flexible polymeric/metal composite 20 is spirally wrapped completely about reinforcement layer 18 of and has an overlap seam 21 that extends helically along hose 70. In this instance, tape 20 is a composite tape having a flexible metal layer 22 such as aluminum and a flexible polymeric layer 24 on at least one of the opposite sides of layer 22 that is not an adhesive type polymer such as described in U.S. Pat. No. 4,510,974 but rather maintains its ability to provide an un-bonded relationship to fibrous reinforcement layers in contact therewith. Examples of polymeric materials suitable singularly or for layer 24 are polyester terephthalate sold under the Trademark "Mylar" by the Dupont Company or polyvinylidene dichloride sold under the Trademark "Saran" by the Dow Chemical Company. Typically, such composite tape features a polymeric layer thickness of about ½-1 mil and a metal thickness of about ½-2 mil.

Tape 21 is surrounded by layer 26 of tensioned braided fibrous reinforcement filaments previously described. An adhesive layer 17 is disposed along the overlap region of layer 22 for bonding the overlap together without bonding either layer 22 to fibrous layer 18 or polymeric layer 24 to fibrous layer 26 as previously described. Layer 26 is surrounded by previously described flexible protective jacket 28.

Figure 4:
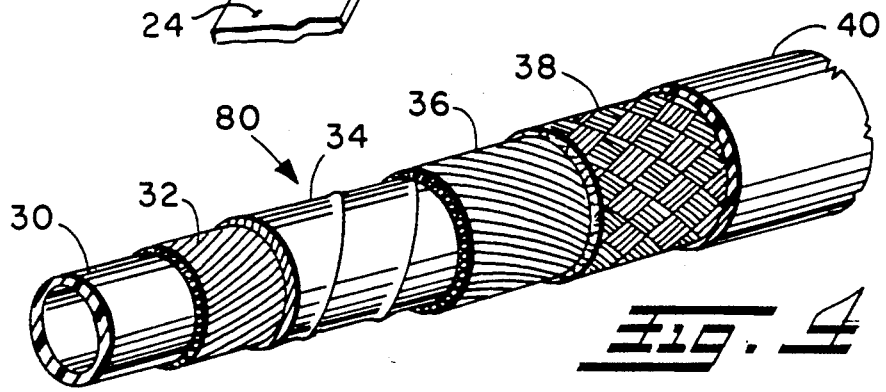

Hose 80 of FIG. 4 illustrates that hoses made in accordance with the invention include spiral wrapped oppositely helically wound fibrous reinforcement layers rather than braided fibrous reinforcement layers and combinations of both. In hose 80, core tube 30 is surrounded by a layer 32 of tensioned helically-wound filaments about which is spirally wrapped flexible polymeric tape 34 which in turn is surrounded by layer 36 of spirally wound tensioned fibrous filaments that are wound in an opposite helical direction to that of the filaments of layer 32 to balance torsional twist as is well known to those skilled in the art.

Layer 36 is surrounded by a layer 38 of braided fibrous reinforcement filaments which in turn is enclosed by an outer flexible protective jacket 40 previously described.

Although not specifically mentioned herein, it is to be understood that various layers, excepting the two fibrous reinforcement between which the flexible metal tape moisture barrier herein described is located, may be bonded together when desired by surface softening techniques, adhesives or other suitable bonding means such as example when braided layer 4 of hose 50 is bonded to core tube 2 and sheath 10 is bonded to braided layer 8.

What is claimed is:

1. An improved flexible reinforced hose for conveying fluids comprising a flexible polymeric core tube, at least two layers of tensioned fibrous reinforcement material disposed about the core tube, and an outer flexible protective sheath disposed about the reinforcement material, wherein the improvement is characterized by said hose including a flexible polymeric tape layer disposed between the reinforcement layers, said tape completely surrounding the core tube and having an overlapping region and in un-bonded relationship with either of the reinforcement layers so as to minimize stress imposed thereupon during bending and fluid pressure pulsing of the hose, and said tape layer adapted to prevent moisture from penetrating through the core tube from outside of the hose and contaminating the fluid being conveyed therethrough.

2. The hose of claim 1 wherein the tape is a composite tape that includes a flexible metal layer disposed on at least one of the sides of the polymeric layer.

3. The hose of claim 1 wherein the tape is a composite tape including a flexible metal layer having the polymeric layer disposed on opposite sides thereof.

4. The hose of claim 1, 2 or 3 wherein the tape is a spirally wrapped tape and the overlap region extends helically about the core tube.

5. The hose of claim 1, 2 or 3 wherein the tape is a longitudinally folded tape and the overlap region extends longitudinally along the core tube.

6. The hose of claim 2 or 3 wherein the metal layer is an aluminum layer.

7. The hose of claim 1, 2 or 3 wherein the polymeric layer is a polyester terephthalate layer.

8. The hose of claim 2 or 3 wherein the metal layer is an aluminum layer and the polymeric layer is a polyester terephthalate layer.

9. The hose of claim 1 wherein the core tube is a composite core tube having inner and outer layers made from different polymeric materials.

10. The hose of claim 1 wherein the core tube is a composite core tube having a substantially non-electrically conductive polymeric inner layer and an electrically semi-conductive polymeric outer layer.

11. The hose of claim 1, 2 or 3 including an adhesive layer disposed along the tape overlap region adapted to bond the overlap together whilst maintaining the unbonded relationship with either of the reinforcement layers.

* * * * *